(No Model.)
T. LANGE.
PROCESS OF OBTAINING METALLIC ZINC FROM SULPHITE OF ZINC BY ELECTROLYSIS.
No. 475,402. Patented May 24, 1892.
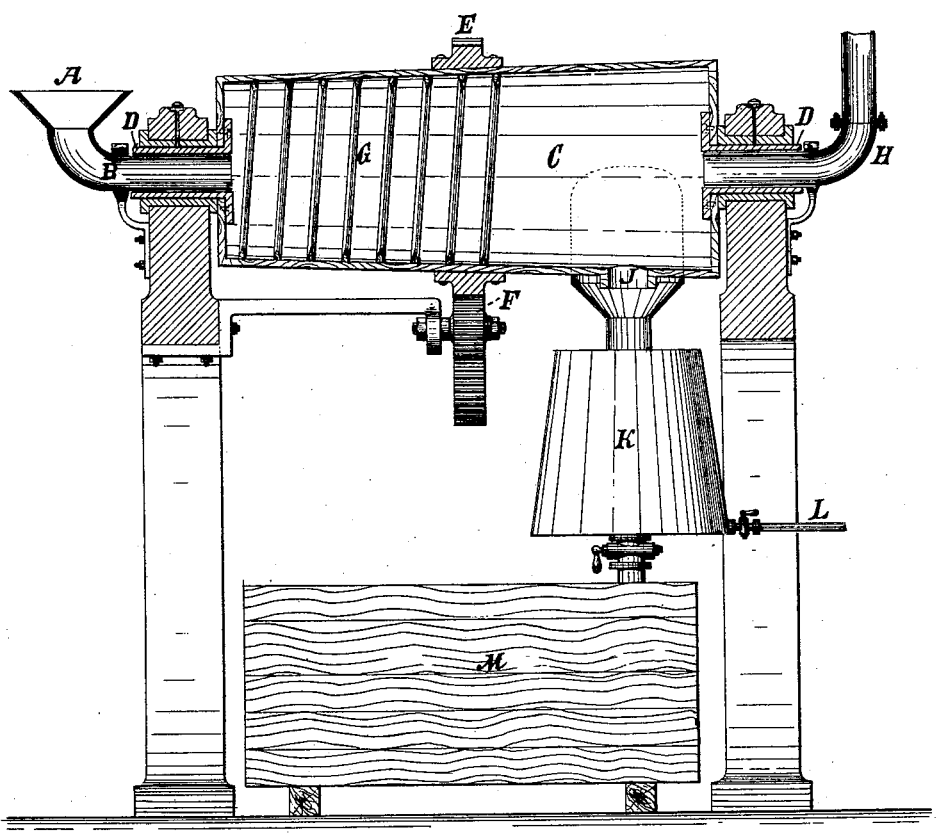

UNITED STATES PATENT OFFICE.

THEODOR LANGE, OF BRIEG, GERMANY.

PROCESS OF OBTAINING METALLIC ZINC FROM SULPHITE OF ZINC BY ELECTROLYSIS.

SPECIFICATION forming part of Letters Patent No. 475,402, dated May 24, 1892.

Application filed June 24, 1890. Serial No. 356,566. (No specimens.)

*To all whom it may concern:*

Be it known that I, THEODOR LANGE, a citizen of the Kingdom of Prussia, residing at Brieg, in the country of Silesia and Empire of Germany, have invented certain new and useful Improvements in the Process of Extracting Metallic Zinc from a Sulphite-of-Zinc Solution by Electrolysis, of which the following is a specification.

The method generally of precipitating the zinc metal by the electric current in a bath of zinc salts has been tried before; but such trials have never led to satisfactory results, first, because the formation of the metallic deposition from sulphate solutions never proceeded in the desired regular and proper manner, and, further, because the preparation of the solution or electrolytic bath from the roasted ores was connected with considerable difficulty and heavy expense. By my improved method such difficulties have been overcome, a considerable economy is effected, and the precipitation of the metal by the aid of hydrothionic acid is entirely omitted.

The ores used contain thirty-five per cent. of zinc and twenty-four per cent. of lead. They are disintegrated and roasted in a vessel, are mixed with hot water, and put in a rotary drum. Into this drum are admitted from one side hot gases arising from the roasting process of a new charge of zinc ores. In the drum sulphite of zinc only is formed and after a certain time the solution is filtered to retain the residues of lead which are gained, as by-products. The other part of the solution passes into another vessel, in which the electrolysis can be effected instantaneously.

The accompanying drawing represents a vertical longitudinal section, partly in elevation, of an apparatus for carrying my process into effect.

The roasted ores, mixed with hot water, are placed in a funnel A and pass through a pipe B into a conical drum C, which has hollow gudgeons D. The drum is revolved by gear-wheels E F. Within the drum C there is fitted on one side a spiral rib G, which slowly carries the ores along. At the other side hot gases containing sulphurous acid are admitted through a pipe H. In the larger half of drum C there is an opening J, closed by a cover. Through this opening the solution is discharged from time to time into a filter K. This filter is connected to an air-pump by a pipe L and conducts the filtered solution into a vessel M, in which the electrolysis is effected. Into the vessel M can be led the gases coming from the roasting process containing sulphurous acid, which, with the oxygen produced, forms sulphuric acid, as a by-product. The sulphurous acid in this process offers a double advantage, its action being not only of chemical importance, but also of considerable electrical value.

In applying the electrolysis to sulphuric solutions of zinc a considerable difficulty existed in keeping the bath constantly in a neutral condition, as also in avoiding the accumulation of considerable quantities of sulphurous acid about the cathode, such amounts of sulphurous acid having the tendency of producing a polarization, through which the development of hydrogen was occasioned. This, with the sulphurous acid, formed sulphuric acid, in consequence of which the deposition of metallic zinc resulted in a spongy state, and even the formation of separate zinc oxides was produced, which was not liable to fusion in this state.

By the decomposition of sulphate of zinc through the electric current an excess of oxygen is produced, which, as stated before, enters into a combination with the sulphurous acid, being transformed by oxidation into sulphuric acid, which will rise to the surface, when it may be drawn off or flow over to be sold or utilized for any purpose.

By the decomposition of the sulphite of zinc the metallic zinc is separated from its oxygen, which, as stated before, enters into a combination with the sulphurous acid that has been developed at the cathode and forms sulphuric acid by oxidation. The other considerable advantage offered by the sulphurous acid consists in increasing the tension of the electric current, which acts to decompose the sulphite of zinc, making little opposition in the electrolytic bath, and in which the water of the sulphite-of-zinc solution is decomposed, the hydrogen freed, and the oxygen forms, with the sulphurous acid on the cathode, sulphuric acid.

In case that for the elimination of the excess of oxygen in the electrolyte the required sulphurous acid could not be obtained directly from the ore of the roasting-furnace the liquid sulphurous acid sold in balloons may be employed with the same result.

I claim as my invention—

The process of obtaining zinc from its ores, which consists in disintegrating and roasting the ore, mixing it with hot water, moving the body of ore and water through a closed vessel, causing the hot sulphurous gases from the ore-roasting process to move in the opposite direction through the ore, delivering the treated ore and water to a filter, drawing off the resulting solution of zinc sulphite, and throwing down the zinc by passing an electric current through the solution, as set forth.

In testimony whereof I hereunto sign my name, in the presence of two subscribing witnesses, this 9th day of June, 1890.

THEODOR LANGE.

Witnesses:
NELLIE B. DUNLAP,
MARION DUNLAP.